United States Patent Office 3,450,404
Patented June 17, 1969

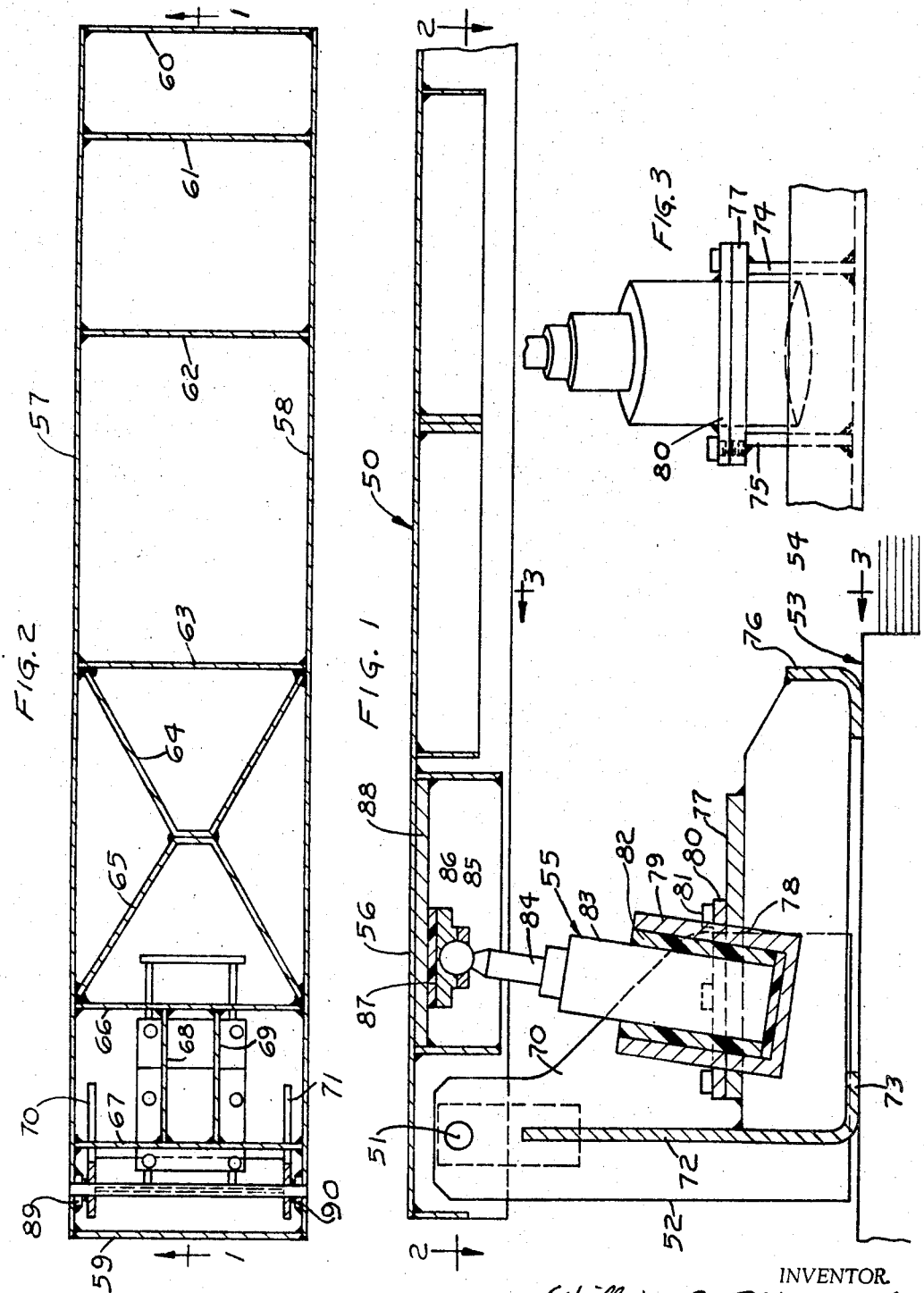

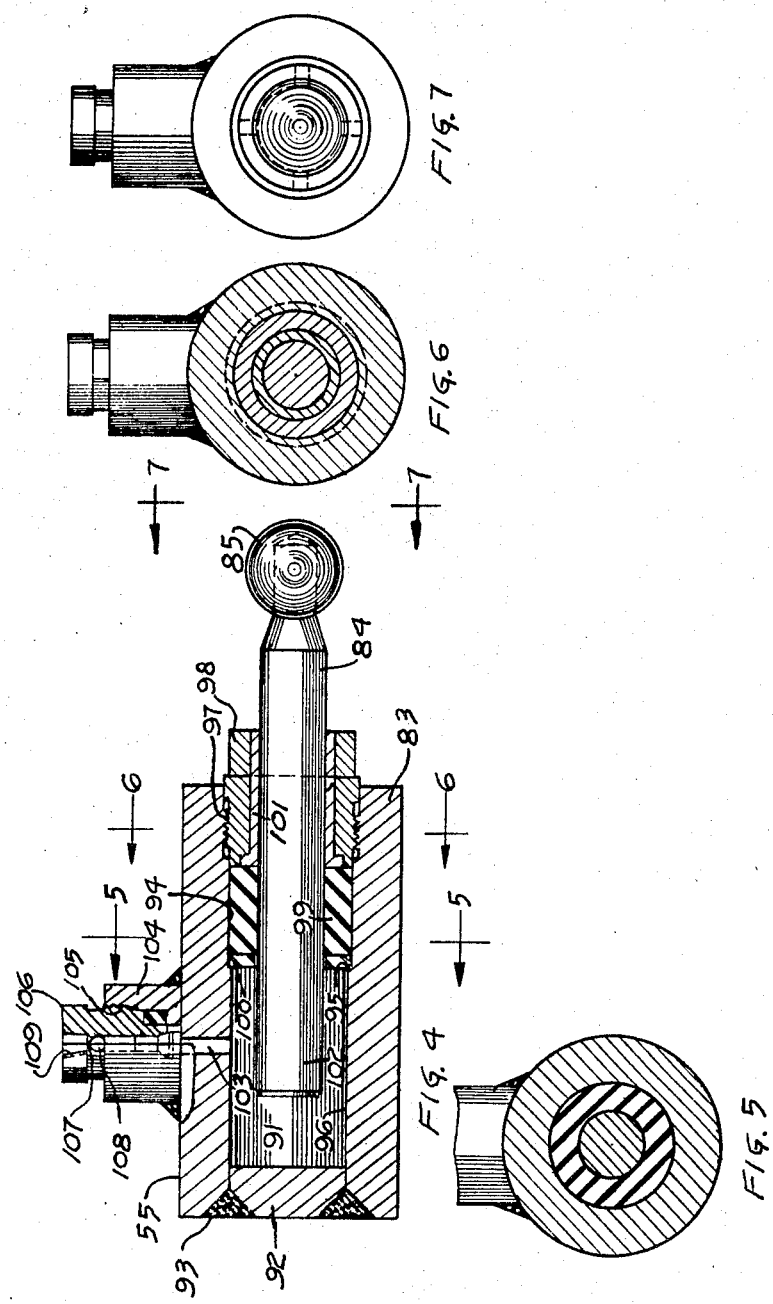

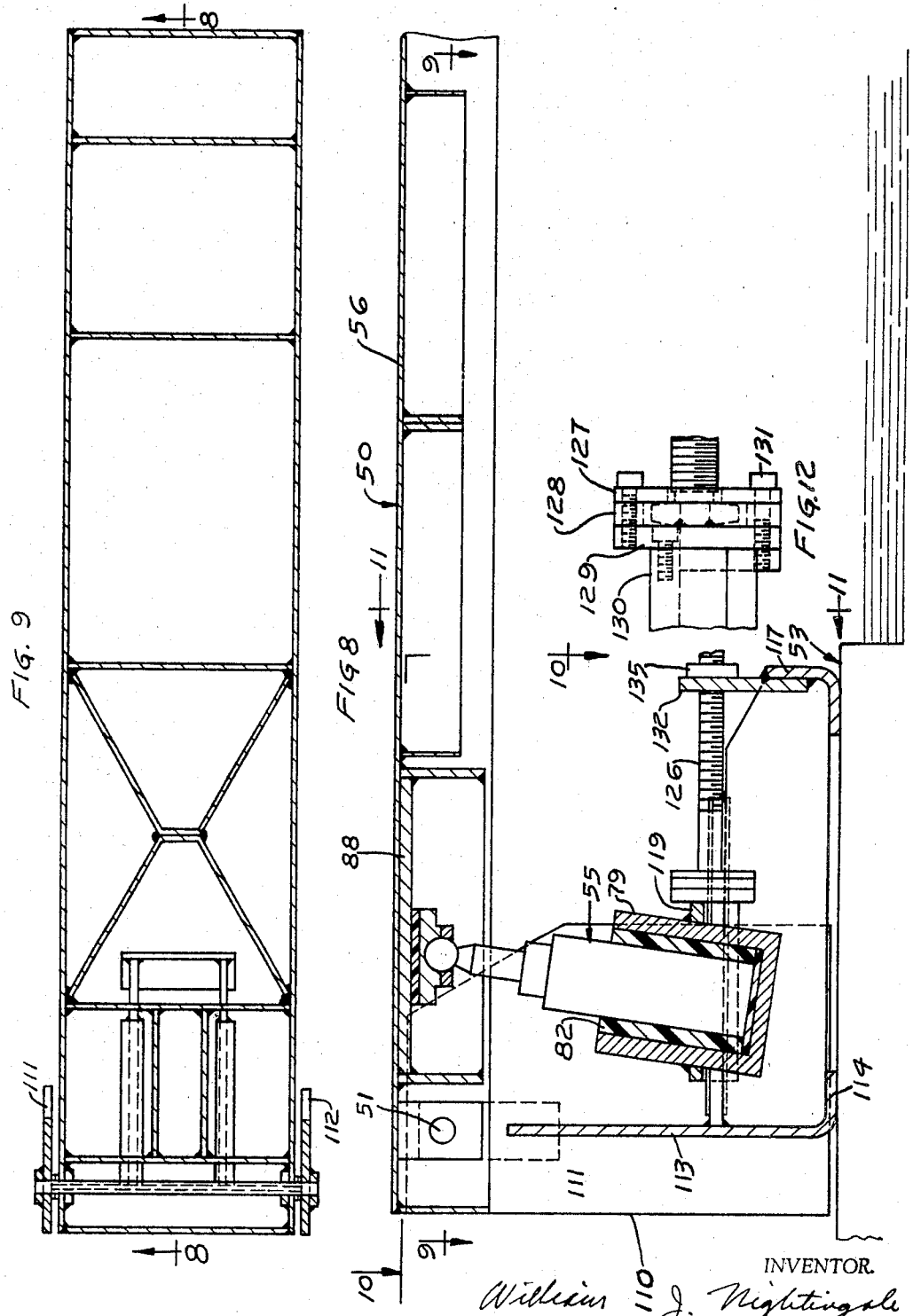

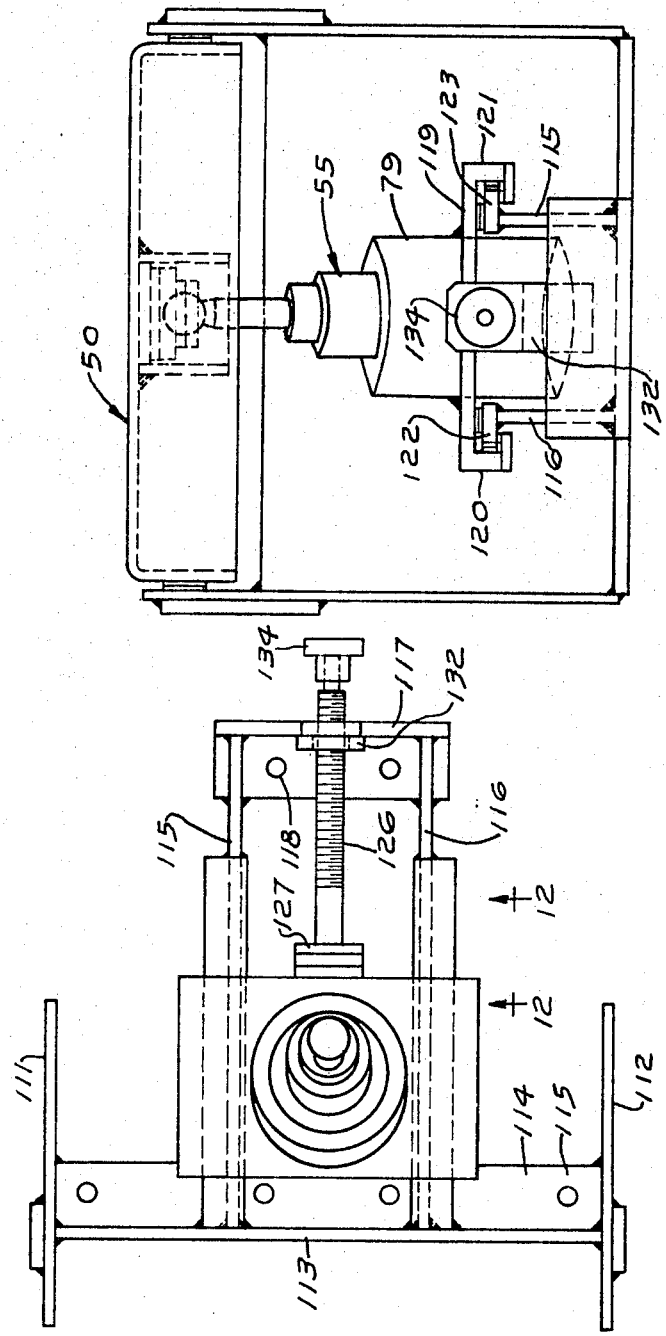

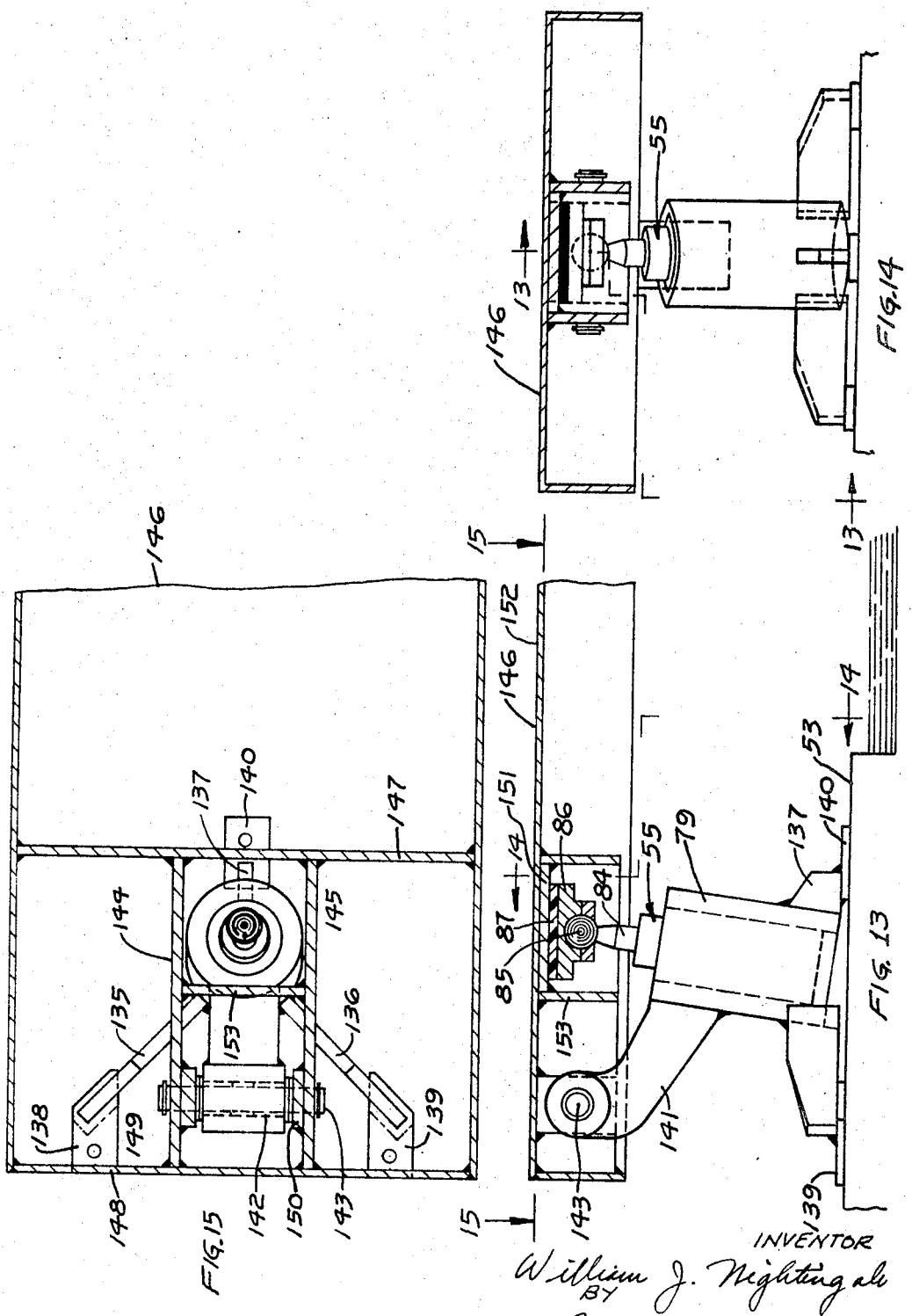

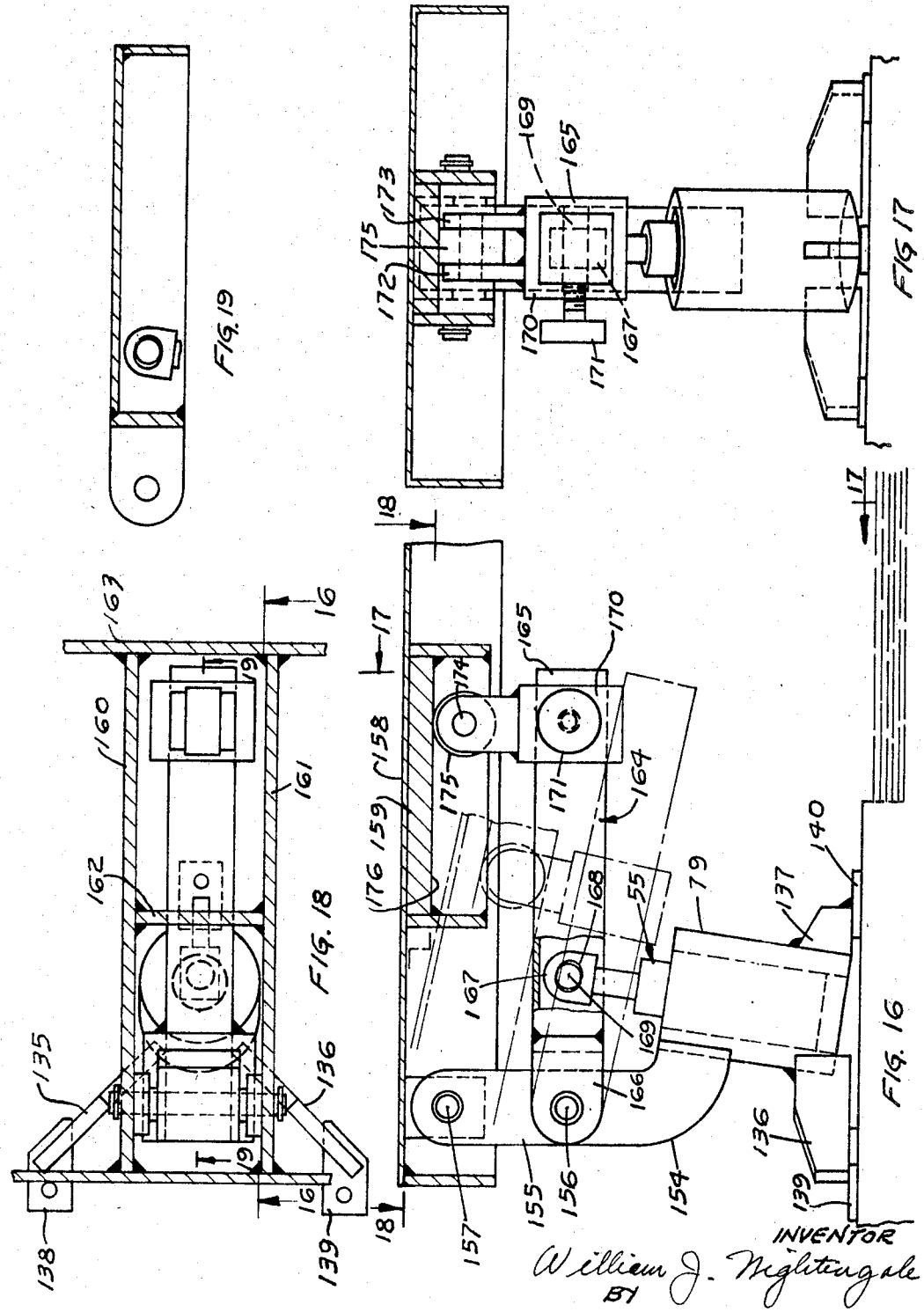

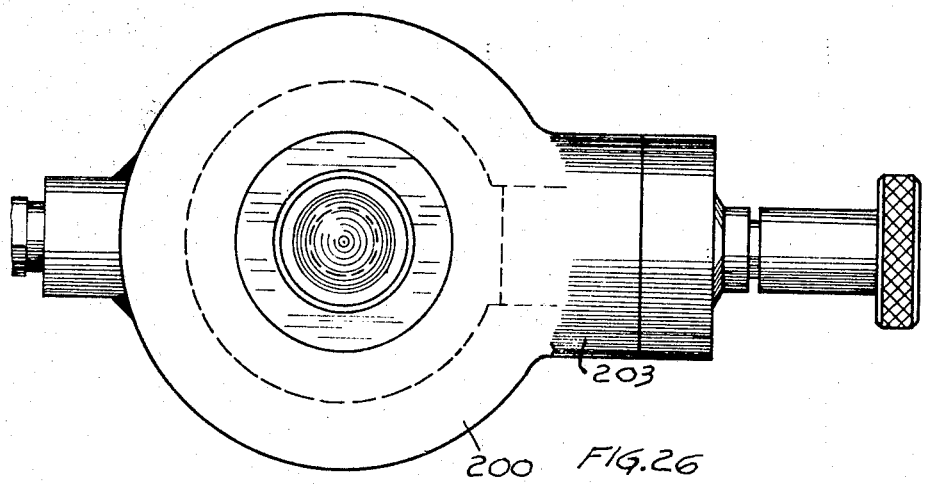
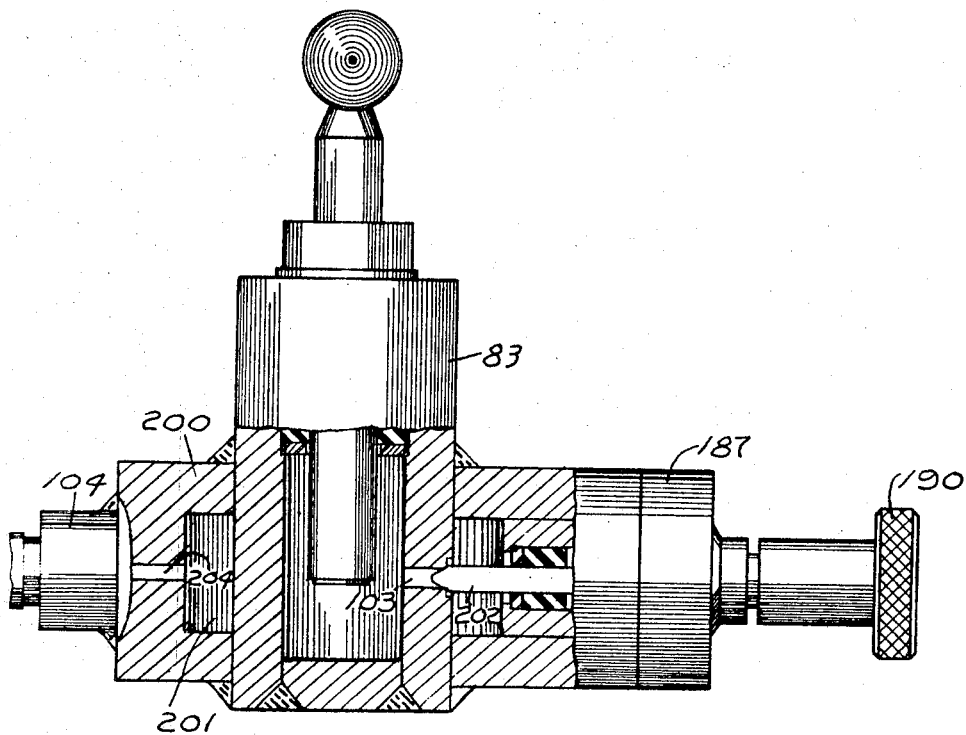

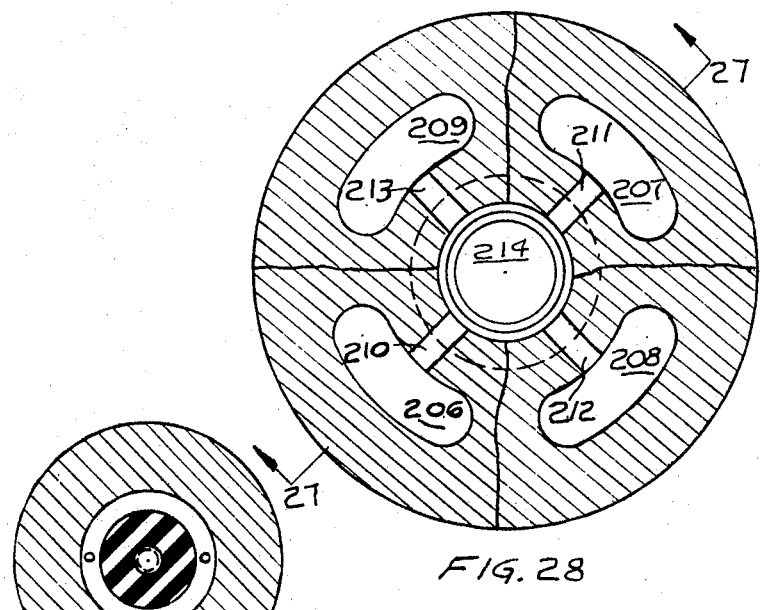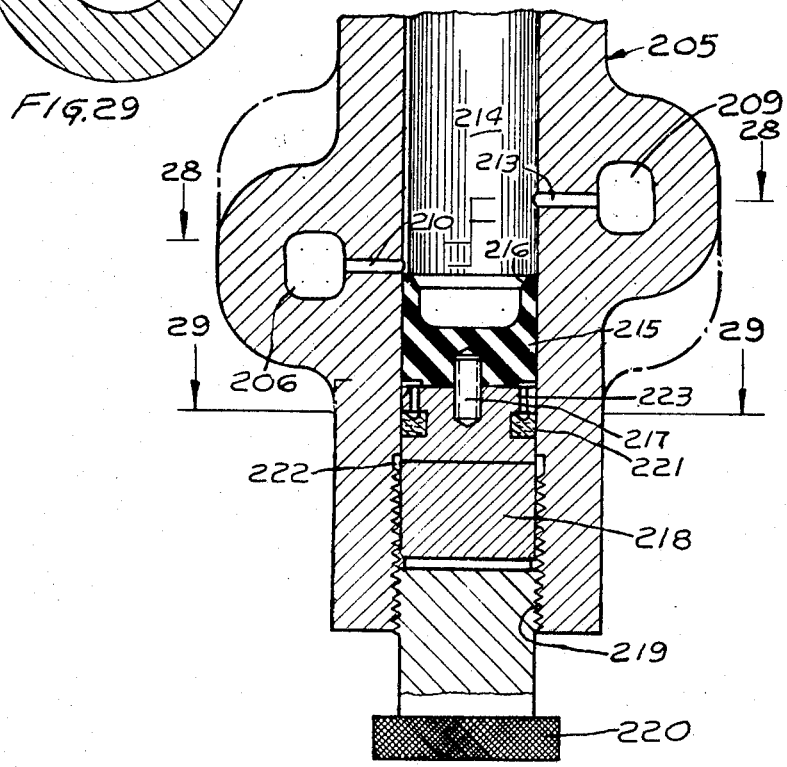

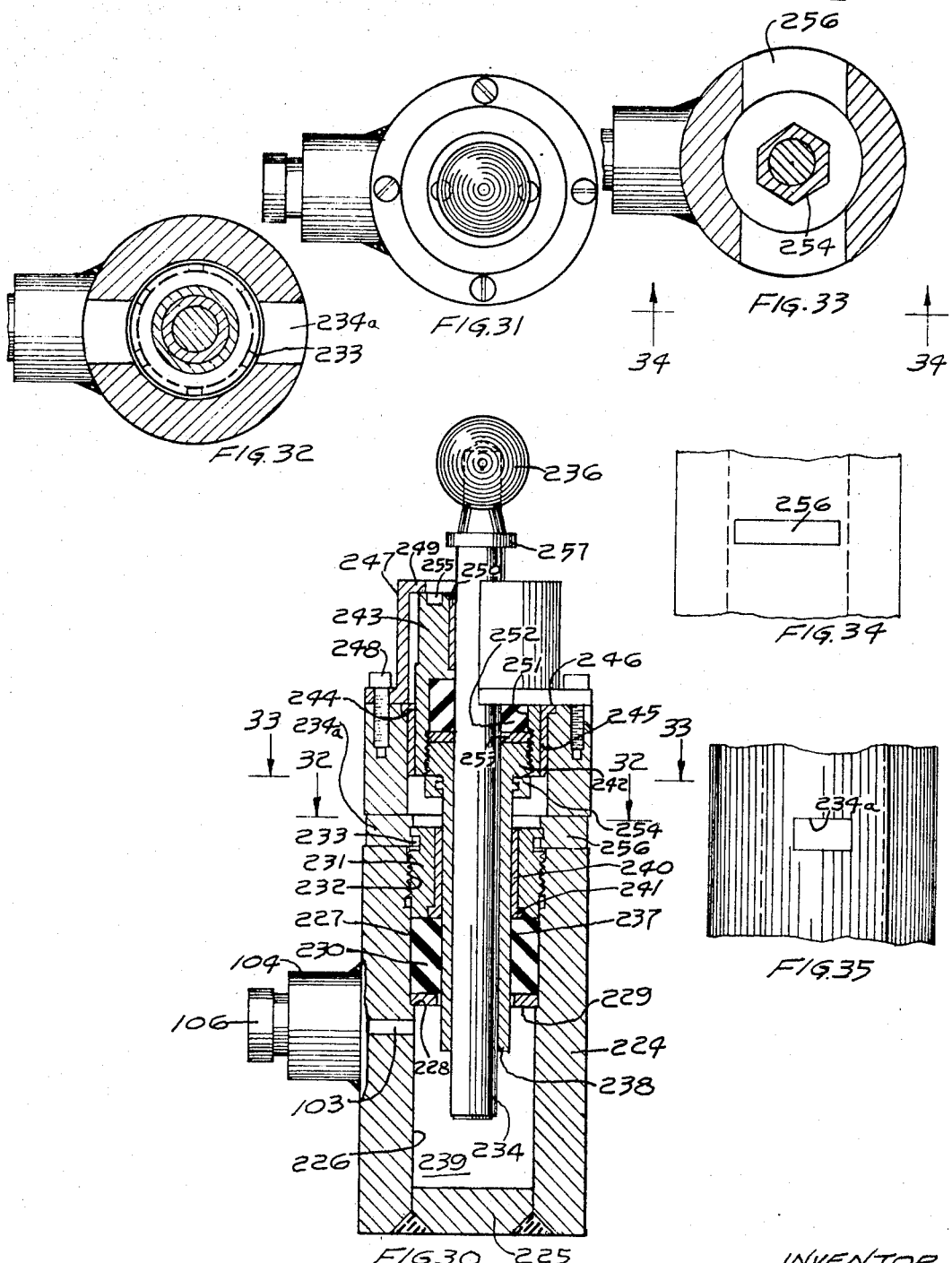

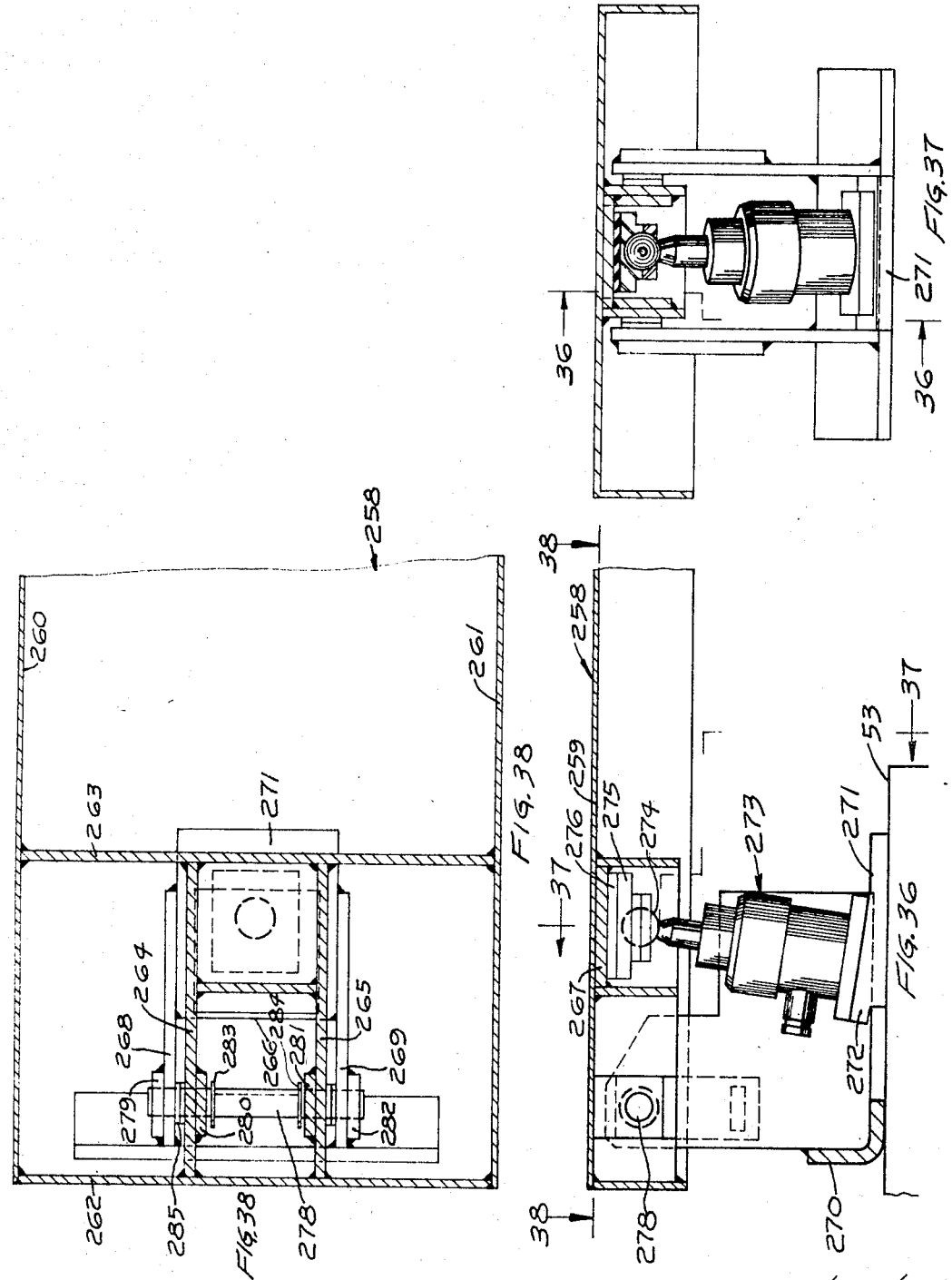

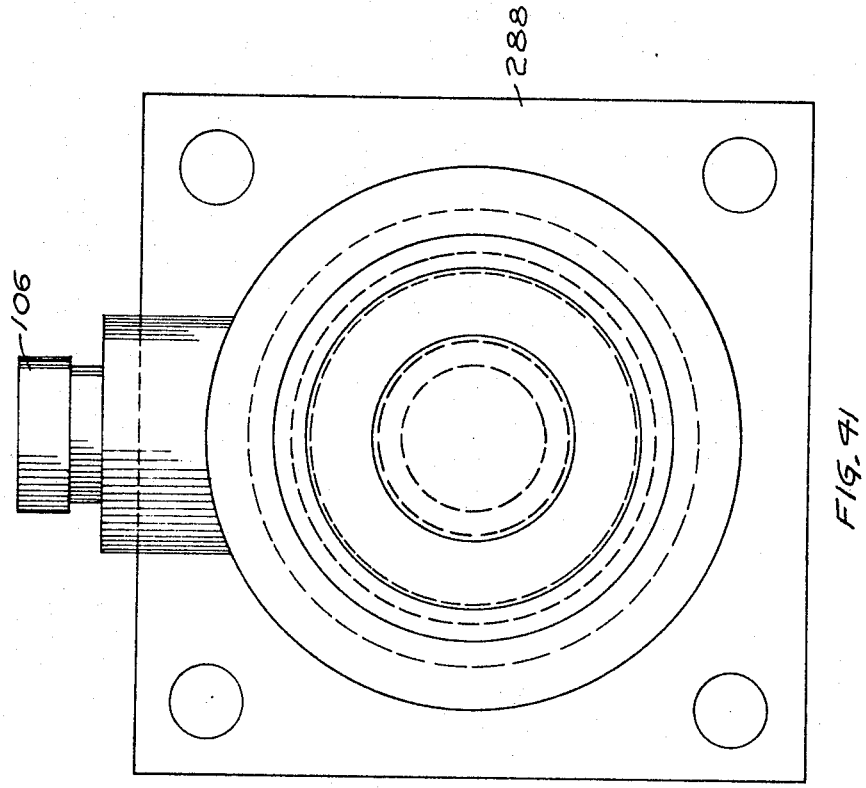
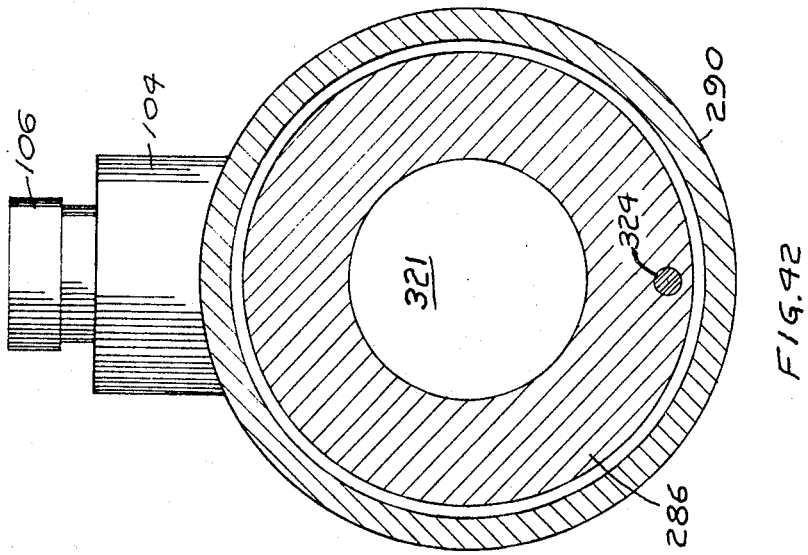

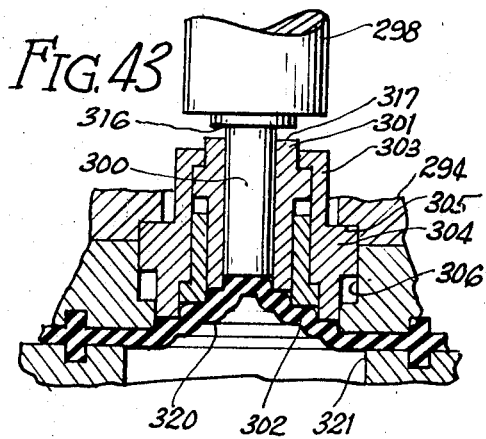
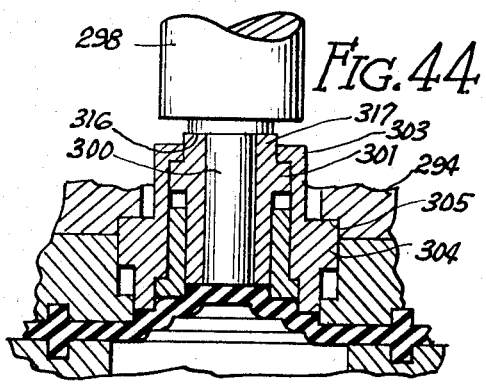
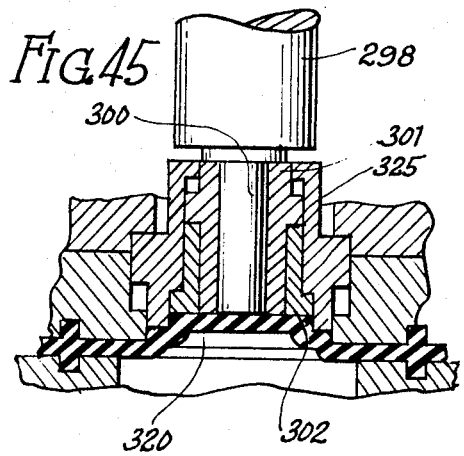
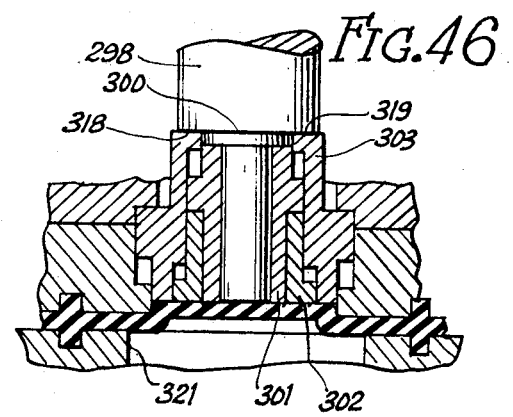
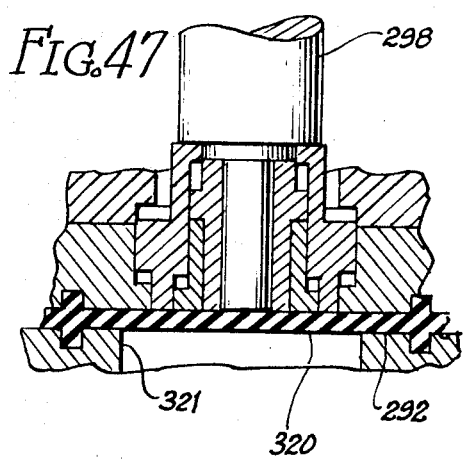
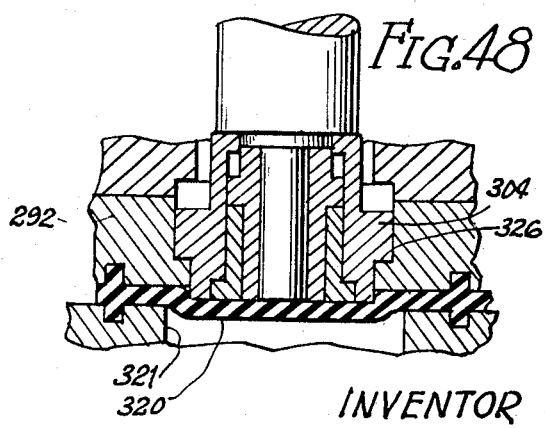

3,450,404
METAL DIVING BOARD WITH LIQUID SPRING
William J. Nightingale, 656 Wrightwood,
Chicago, Ill. 60614
Filed July 21, 1965, Ser. No. 473,759
Int. Cl. A63b 5/10
U.S. Cl. 272—66                                                                      17 Claims

ABSTRACT OF THE DISCLOSURE

A diving board wherein the platform may be a non-resilient member hinged to a support, with a liquid spring interposed between the member and support to provide the necessary springing effect to the platform. Various forms of liquid spring and supports for the spring are provided to produce a desired degree or variability of spring-back.

---

This invention relates to diving boards having rigid decks and supports therefor and to a liquid spring to be used therewith.

In my co-pending application Ser. No. 320,344, filed Oct. 31, 1963, for Diving Board, there is disclosed and claimed a diving board comprising a rigid metal platform or deck, a rigid support for the deck, and a torsion spring interposed between the platform and support for providing the necessary spring-back for the diver. This invention relates to the same general construction of diving board and has for its broad object the adaptation of the combination of a diving board having a rigid deck and a rigid support therefor with liquid springs.

Another broad object of this invention is the provision of a diving board comprising a rigid deck, a rigid support, a pivot mounting the deck on the support and a liquid spring interposed between the deck and spring, wherein the relationship of these component parts is such as to insure a forward component to the spring-back force provided by the board.

It is also a broad object of this invention to provide a diving board of all-metal construction, the requisite spring-back for which is provided by a liquid spring, the energy-storing capacity of which may be changed at will to provide a "soft" action or a "hard" action.

A further object of this invention is the provision of a diving board having a rigid deck and a liquid spring for providing resilence for said deck wherein said spring has a plurality of deflection rates, one rate for each range of movement of the diving board, such that it will deflect readily under a relatively light impact through a first range of movement, but will require disproportionately greater impacts to deflect throughout succeeding ranges of movement.

A specific object of this invention is the provision of a liquid spring and mounting therefor in a diving board which is simple and yet allows the deflection of the board for a given impact to be altered so that if the board is to be used predominently by children, it will deflect under a relatively lighter impact than it would if it were to be used predominently by adults.

Another specific object of this invention is a liquid spring for diving boards or other devices the maintenance of which requires only the addition of a few cents worth of oil from time to time.

Yet another specific object of this invention is a liquid spring for diving boards having a plurality of chambers for the liquid, with valve means for controllably adding one or more chambers to a main chamber whereby to change the characteristics of the spring.

A further specific object of this invention is the provision of a liquid spring having a plurality of plungers with means for making two or more simultaneously operable to change the characteristics of the spring as a whole.

These and other objects of this invention will become apparent from the following detailed description of a preferred embodiment thereof and of various modifications thereof, when taken together with the accompanying drawings in which:

FIG. 1 is a side elevational view of a portion of a diving board, in section, showing a liquid spring installed therein;

FIG. 2 is a plan view in section, on a smaller scale, of the diving board of FIG. 1;

FIG. 3 is a fragmentary end elevational view of the liquid spring and mounting therefor of FIG. 1;

FIG. 4 is a sectional view through the spring of FIG. 1, on a larger scale;

Figure 21:
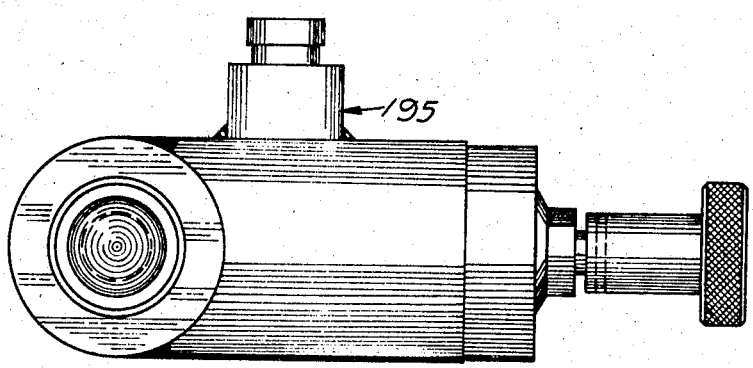
Figure 23:
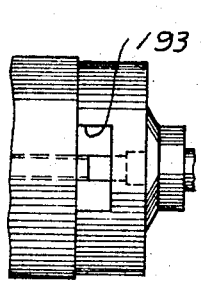
Figures 20, 22:
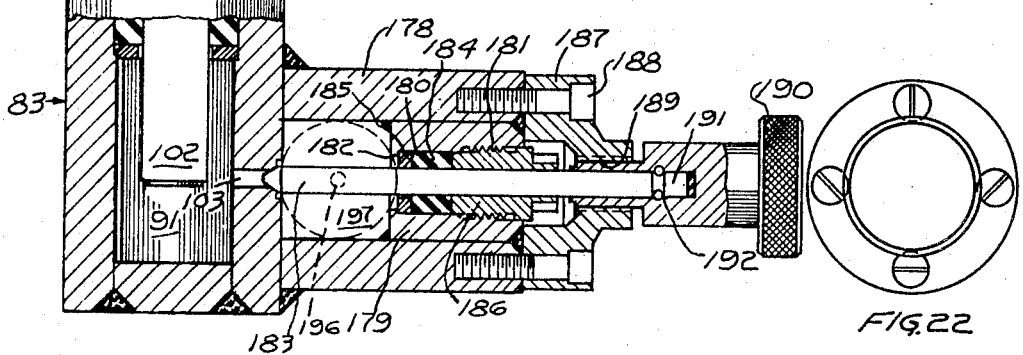
Figure 24:
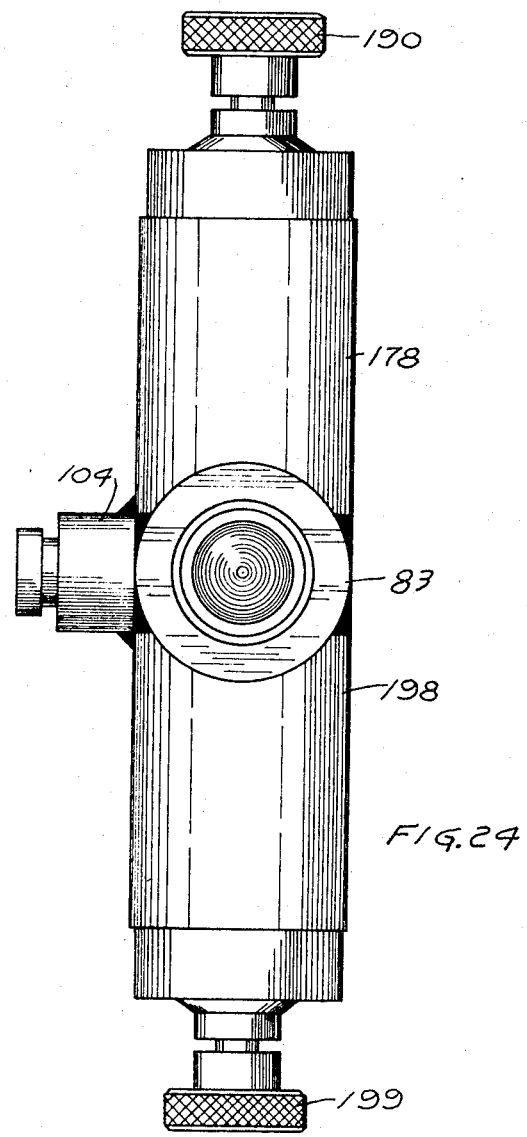
Figures 39, 40:
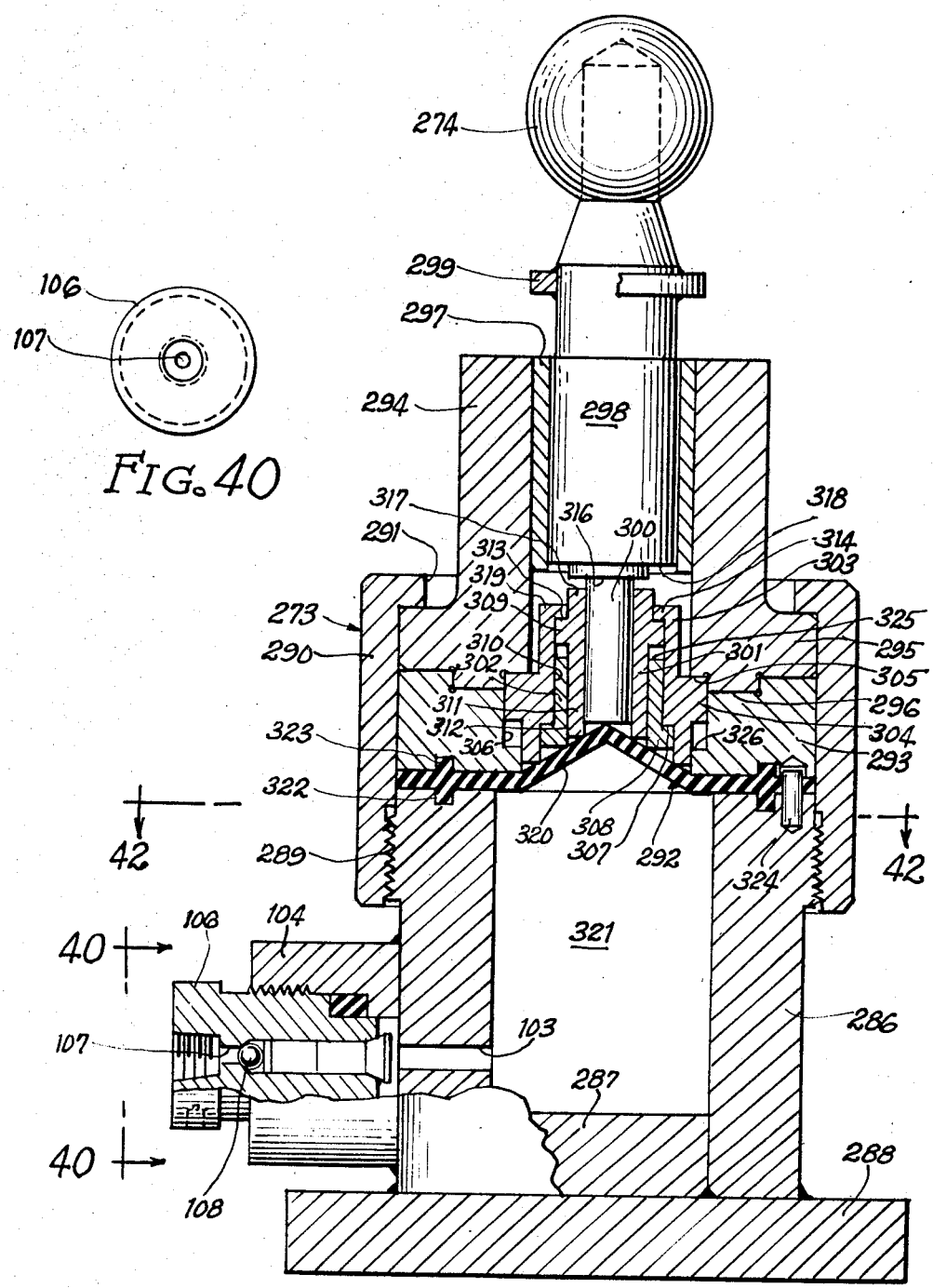

FIGS. 5 and 6 are sectional views on an enlarged scale through the spring of FIG. 4 taken along lines 5—5 and 6—6, respectively, of said FIG. 4;

FIG. 7 is an end view of the spring of FIG. 4;

FIG. 8 is a side elevational view in section, of a portion of a modification of a diving board showing an adjustable mounting for the liquid spring thereof;

FIG. 9 is a plan view in section of the modification of FIG. 8 on a smaller scale, taken along line 9—9 of FIG. 8;

FIG. 10 is a plan view of the support for the diving board of FIG. 8;

FIG. 11 is an end elevational view of the diving board of FIG. 8 taken along line 11—11 of FIG. 8 and looking in the direction of the arrows at the end thereof;

FIG. 12 is an enlarged, fragmentary side elevational view of a support for the adjustable element of the support of FIG. 10;

FIG. 13 is a fragmentary side elevational view, in section, of a second modification of the support for a diving board using a liquid spring;

FIGS. 14 and 15 are respectively end and plan views in section of the modification of FIG. 13 taken along lines 14—14 and 15—15, respectively, of FIG. 13;

FIG. 16 is a side elevational view of a portion of a third modification of diving board incorporating a liquid spring of the type shown in FIG. 13;

FIGS. 17 and 18 are respectively front and fragmentary plan views in section of the diving board of FIG. 16 taken along lines 17—17 and 18—18 of FIG. 16;

FIG. 19 is a fragmentary side elevational view of a portion of the diving board of FIG. 16 taken along line 19—19 of FIG. 18;

FIG. 20 is a side elevational view, partly in section, of a modification of the liquid spring of FIG. 4;

FIG. 21 is a plan view of the spring of FIG. 20;

FIG. 22 is an end elevation view of a portion of the spring of FIG. 20;

FIG. 23 is a side elevational view of a fragment of the spring of FIG. 20 showing an access opening to an adjustable element thereof;

FIG. 24 is a plan view of a further modification of the liquid spring of FIG. 4;

FIG. 25 is an elevational view, partly in section, of a modification of the liquid spring of FIG. 4 showing a means for adjusting the rate thereof;

FIG. 26 is a plan view of the spring of FIG. 25;

FIG. 27 is an enlarged view in section of a fragment of a third modification of the spring of FIG. 4;

FIG. 28 is a plan view in section, taken at four different elevations of the spring of FIG. 27;

FIG. 29 is a sectional view of the spring of FIG. 27 taken along line 29—29 thereof;

FIG. 30 is an elevation in section and on the scale of FIG. 4 of a two-stage liquid spring constituting a fourth modification of the spring of FIG. 4;

FIG. 31 is a plan view of the spring of FIG. 30;

FIGS. 32 and 33 are sections taken through the spring of FIG. 30 along lines 32—32 and 33—33 of FIG. 30;

FIGS. 34 and 35 are fragmentary elevational views of the spring of FIG. 30 taken substantially 90° apart;

FIGS. 36, 37 and 38 are respectively fragmentary side, end elevation, and plan views of a further modification of the diving board of FIG. 1, showing a diaphragm type multi-stage spring installed therein;

FIG. 39 is an enlarged elevational view in section of the diaphragm type spring of FIG. 36 constituting a fifth modification of the spring of FIG. 4;

FIG. 40 is an end elevational view of a portion of the spring of FIG. 39 taken along line 40—40 thereof;

FIG. 41 is a plan view of the spring of FIG. 39;

FIG. 42 is a section taken through the spring of FIG. 39 along line 42—42 of that figure; and FIGS. 43 to 48 inclusive are fragmentary sectional views through the spring of FIG. 39 showing said spring in various stages of operation.

All of the combinations of rigid deck, support for the deck on which the deck is pivoted and liquid spring between the deck and support illustrated in the accompanying drawings have in common the feature of locating the pivot on the support in such manner as to provide a spring-back which has a forward component. This in turn is made possible by inclining the liquid spring forwardly so that side thrust on the plunger of the spring is kept at a minimum. The forward inclination of the spring thus requires a support which will accomodate such position of the spring. Within this common characteristic, the combinations of deck, support and liquid spring, fall into two main categories, viz. (1) those with a spring having a single range of movement and a single spring rate and (2) those with a spring having two or more ranges of movement and consequently two or more rates.

In the first category are three species: (a) those with a fixed deck and support, (b) those with a fixed deck and an adjustable support for the spring (FIGS. 8–12); and (c) those with a fixed support and an adjustable deck (FIGS. 16–19). Under (a) are three species shown in (a1) FIGS. 1–7; (a2) FIGS. 13–15 and (a3) FIGS. 36–38.

In the second category are shown two variable springs which have either (a) multiple chambers with means for selectively making one or more of the chambers effective and (b) multiple pistons with the effectiveness of the pistons determined by the deflection of the spring. Under (a) are two species, viz (a1) those with side chambers with individual valves to make them selectively effective and (a2) that with side chambers and a single valve for progressively making said chambers effective (FIGS. 27–29). In (a1) are three species shown in (a1a) FIGS. 20–23; (a1b) FIG. 24; and (a1c) FIGS. 25–26. Under (b) are two species; (b1) that with successively operable pistons (FIGS. 30–35) and (b2) that with a diaphragm (FIGS. 39–47).

The basic form of diving board incorporating the features of this invention is shown in FIGS. 1–7, to which reference is now made. In these FIGURES there is shown at 50 a diving board of rigid construction, pivotally mounted at 51 to a support 52 appropriately fixed by bolts or otherwise (not shown) to a prepared foundation 53 at the edge of a pool 54. Between diving board 50 and support 52 is a liquid spring 55 which provides the support for the board 50 in the "rest" position thereof, and the resilence for a spring-back when the board is subject to an impact by a diver.

Diving board 50 is comprised of a sheet of steel 56, constituting the deck of the board, and a plurality of rigidifying members. The rigidifying members are comprised of parallel rectangular side sheets 57 and 58, parallel rectangular ends of sheet steel 59 and 60, and various intermediate reinforcing struts 61, 62, 63, 65, 66, 67, 68 and 69, each of which is similarly made of sheet steel appropriately welded to both the deck 56 and sides 57 and 58, or to one another, as 63–64, 65–66, and the struts 68 and 69 to struts 66 and 67.

Support 52 is comprised of spaced upright members 70, 71, connected together by a plate 72 by welding or other appropriate means, the lower end of which 73 being bent at right angles to the plane of said plate 72 to provide a surface upon which the support may rest and also by which such support may be secured by fasteners (not shown) to the prepared foundation 53. A pair of relatively low substantially identical spaced plates 74 and 75 are secured to plate 72 at right angles therewith and extends forwardly from said plate to a transverse angle iron 76 to which the ends of said plates 74 and 75 are welded. Said transverse angle iron 76 forms a bearing surface for support 52 spaced from plate 72 to which additional fasteners (not shown) may be applied to secure the forward end of said support to the prepared foundation 53. A relatively heavy plate 77 extends horizontally across the upper edges of the plates 74 and 75 and is secured thereto so as to be supported by said plates 74 and 75.

Plate 77 has an opening 78 therein through which extends a cylindrical cup 79. Said cup 79 has secured thereto an apertured plate 80 near the mid portion of said cup, said plate being adapted to rest upon plate 77 and to be secured thereto by appropriate bolts 81. Said cup 79 may be lined with rubber 82 into which is placed the liquid spring 55 which, as will be described in detail hereinafter, has a cylindrical housing 83 from which extends the operative end 84 of the spring plunger. Said end 84 terminates in a ball 85 upon which is mounted a pad 86, the upper surface of which may be covered with a rubber pad 87 adapted to contact a rigid plate 88 secured to the under side of the deck sheet 56.

Pivot 51 is comprised of a rod which extends through appropriate openings in the sides 57 and 58 of the deck 50, said sides being reinforced at said openings by inserts 89 and 90 appropriately welded to the inner surfaces of the parallel sides 57 and 58.

The liquid spring 55 may take several forms, one of which is shown in FIGS. 4 to 7 inclusive. In this form the cylindrical housing 83 is fabricated from a thick walled tube which is cut to length, machined on the interior to form a smooth-walled chamber 91, one end of which is closed off by a disc 92 appropriately welded as at 93 to the tubular housing 83. The opposite end of housing 83 from disc 92 has a counterbore 94 forming a shoulder 95 with the interior wall 96 defining chamber 91. The outer region 97 of counterbore 94 is threaded to receive a threaded sleeve 98 which functions as a gland to compress a ring 99 of packing against a washer 100 bearing against shoulder 95. Said ring 99, in the form chosen to illustrate this invention, is an endless ring of rubber having a durometer hardness of approximately 56. A bearing is formed for the operative end 84 of the spring by a flanged bearing sleeve 101 retained against axial movement by threaded sleeve 98.

The plunger of the spring 55 is formed from a cylindrical rod 102 which is of constant diameter throughout its length so that the operative end 84 is merely the outwardly protruding end of the plunger. Said plunger extends inwardly into chamber 91 to an extent calculated to establish a displacement relationship between the plunger and liquid in the chamber 91, which will produce the desired liquid spring action.

Access to chamber 91 for purposes of filling it or for introduction sufficient liquid to make up for leakage, is via a side hole 103 which communicates with the interior of a short, thick-walled tube 104 welded to the outside of housing 83. The interior of tube 104 is threaded at 105 to receive a fitting 106. A central passageway 107 is formed in fitting 106 which communicates with a seat for a ball check valve 108, and the outer region of passageway 107 is enlarged and threaded at 109 to receive the end of a supply tube or the like from which liquid for the cylinder may be pumped.

The liquid for the spring may be any of the liquids normally used for this purpose and may even be water. However, to avoid rust, etc., and in view of the small quantity of liquid required, I have found it desirable to use oil, or one of the silicone lubricants of low viscosity.

With liquid spring 55 in place in the diving board of FIGS. 1 to 3, an impulse imparted to the overhanging right hand end as viewed in FIG. 2 of the deck 50, is transmitted with reduced amptitude, but with multiplied force, to the spring 55. This causes the plunger of the spring to be forced into the liquid-filled chamber 91. The liquid is, in turn, pressurized and thereby holds check valve 108 closed, and forces washer 100 upwardly against the packing ring 99. Said ring is to some extent compressed as is also the rubber lining 82 in cup 79, but due to the hardness of the rubber used therein the greater proportion of the pressure will be absorbed in the resilience of the liquid itself. The stored energy of the impact is released to urge the p lunger 102 outwardly against the underside of the deck 50 and provide the diver, who had created the initial impulse, with the desired upward spring-back force. It is understood that a suitable restraining mechanism (not shown), such as is disclosed in my co-pending application Serial No. 320,344, filed Oct. 31, 1963, for Diving Board, will be used to limit the upward movement of the deck 50. Any loss of liquid resulting from repeated use of the spring 55 may be made up through the side hole fill opening 103 and the connected tube 104 and fitting 106.

It is important that the spring-back force have a forward component to avoid having the diver fall back upon the deck 50. It may be noted that in its relaxed state, deck 56 is substantially horizontal and pivot pin 51 is just a short distance below deck 56. Ball 85 of the liquid spring 55 is substantially at the same level as pivot pin 56. Depressing the deck, as would be the case when it is jumped upon by a diver, causes the ball 85 to tend to describe an arc which has an increasingly greater rearward component. This component produces a side thrust on plunger 102 which not only increases wear, but tends to distort the packing ring 99 and cause leakage of the liquid out of chamber 91. The side thrust can be minimized by causing one-half of the thrust to be exerted in one direction on plunger 102 and the other half in the opposite direction. This is accomplished in the board of FIGS. 1–7 by inclining the axis of plunger 102 forwardly at an angle to the vertical which is approximately one-half the total average angular displacement of the deck 56.

This, plate 80 is secured to cup 79 at an angle to the axis of the cup which is one-half the anticipated maximum angular displacement of deck 56 so that when plate 80 is secured to plate 77, spring 55 will be similarly inclined.

Some of the side thrust between the deck 56 and pad 86 is absorbed by the rubber pad 87 as well as by the rubber lining 82 which allows the spring 55 to move transversely slightly in cup 79.

The form shown in FIGS. 1 to 3 is best adapted for use with a diving board of the normal 9 foot length. It may be desirable, however, to shorten the length of the deck, that is, to use the same support but with a shorter deck, or in, in some cases, to use the same deck but to alter the resilience of the board as a whole so that it may be used by small children as well as by the average adult. Such changes in flexibility as are required to achieve these objectives can be achieved by shifting the location of the liquid spring 55 toward or away from the pivot 51. One manner of achieving this result is shown in FIGS. 8 to 11. In this form the support 110 is comprised of a pair of side plates 111 and 112 which are upright and spaced to receive between them the diving board 50. Said side plates are held in spaced relation by a transverse plate 113, the bottom region of which is bent forwardly to form a horizontally disposed flange 114 having openings 115 therein by which said flange may be secured to an appropriate foundation, such as 53. Extending forwardly from transverse plate 113 and secured thereto by welding or the like, are parallel upright spring support plates 115, 116 (FIG. 11), the forward ends of which are in turn welded to the interior surfaces of a transverse angle iron 117. Said transverse angle iron 117 also has openings 118 therein by which the front end of the support may be secured to the prepared foundation 53.

Liquid spring 55 with its cup 79 and rubber lining 82 are welded to a plate 119 which is similar to plate 80 of FIG. 1, except that plate 119 extends laterally to either side of cup 79 and then downwardly to form spaced parallel flanges 120, 121 which embrace a pair of flat rails 122, 123 welded to the tops of spring support plates 115, 116. Inwardly directed retaining strips 124 and 125 are secured to the bottom edges of flanges 120, 121 and extend under rails 122 and 123 to substantially prevent vertical movement of plate 119 relative to rails 122 and 123. Horizontal movement, however, of plate 119 on rails 122 and 123 is permitted and is effected by a screw 126 which extends through an aperture plate 127 (FIG. 12) secured through an apertured spacer 128 to a transverse plate 129, the latter, in turn, secured by screws 130 to the front end of plate 119. A rigidifying member 130 is secured to the back of plate 129 through a common screw 131 which holds all of said plates together, said rigidifying member being disposed below plate 119 and abutting the under surface thereof.

The opposite end of screw 126 passes through a post 132 welded to the upright leg of angle iron 117 and through a ring 133 welded to the front end of post 132. The openings in the post 132 and ring 133 are threaded so that as the screw 126 is turned said screw moves axially through the post, thereby moving plate 119 and the associated cup 79 and liquid spring 55. The turning of the screw may be accomplished through an ordinary knob 134 appropriately pinned or otherwise rigidly, non-rotatively secured to the free end of screw 126.

Thus in the form shown in FIGS. 8 to 12 inclusive, the location of the liquid spring 55 relative to the pivot 51 may be adjusted so that for a relatively stiff operation of the diving board the spring is located at a point located a greater distance away from pivot 51 and for a softer action the spring is moved toward the pivot 51. Thus the same support 110 may be used with various lengths of diving board, or it may be used with a given length but adjusted to give a softer action for children and a stiffer action for adults.

Inasmuch as the upper end of the spring in FIG. 8 is not rigidly secured to the deck, but is free to slide along plate 88, the lateral movement of the spring on its support 110 does not in any way affect the operation of the spring.

The form of diving board shown in FIGS. 13, 14 and 15 uses a simpler form of support. Thus, instead of a support made up of side plates and transverse plates secured to the side plates, the modification of FIG. 13 uses the cup itself as a portion of the support. Thus the cup 79 has three legs 135, 136 and 137 welded thereto, each of said legs in turn having an apertured pad 138, 139 and 140 secured to the underside thereof, said pads comprising the means by which the support is secured to prepared foundation 53. An arm 141 is welded to cup 79 and extends rearwardly and upwardly to form a bearing 142 for a pivot pin 143 passing therethrough. Said pin 143 is retained in spaced plates 144 and 145 extending longitudinally of a diving board 146 between transverse reinforcing plates 147 and 148. Plates 144 and 145 are reinforced at 149, 150 to provide greater bearing area for the pivot pin 143. The spring 55 is retained in cup 79 in substantially the same manner as in the previous two forms. Similarly the operative end 84 of the spring is provided with a ball 85 and pad 86 bearing against a rubber pad 87 which in turn bears against a plate 151 secured to the underside of the deck 152. A reinforcing plate 153 extends between and is fastened to the plates 144 and 145.

In the form shown in FIG. 13, cup 79 is also inclined to the vertical, as are the cups in the preceding two forms and for the reasons given above.

The form shown in FIGS. 16 to 19, inclusive, is similar to that of FIGS. 13 to 15, inclusive, except that a compound adjustable lever system is used between the diving board and the operative end of the liquid spring. Using the same housing 79, legs 135, 136 and 137, and pads 138, 139 and 140, as in the FIG. 13 modification, a new arm 154 is welded or otherwise secured to housing 79. Said arm 154 has a vertical section 155 which makes it higher than arm 141 of FIG. 13, and said vertical section 155 supports a pair of pivots 156 and 157 vertically spaced from one another. A diving board 158 is pivotally mounted on said pivot 157 and is provided with a heavy rigid plate 159 on the underside thereof, said plate 159 being retained between spaced longitudinal reinforcing members 160 and 161 and spaced transverse reinforcing members 162 and 163.

A lever 164 is pivoted to the vertical section 155 of arm 154 at pivot 156. Said lever 164 is comprised of a box section 165, at the end of which is welded a U-shaped strap 166 which embraces vertical section 155 and receives the pivot 156. The liquid spring 155 terminates in a knuckle 167 having a slot 168 therein through which passes a pivot pin 169 appropriately secured to the side of the box section 165. A slide 170 is mounted on square section 165 of lever 164 and may be fixed thereto in any one of a number of positions by a set screw 171. On the upper part of slide 170 are fixed spaced standards 172, 173 which support a shaft 174 on which is mounted a roller 175. Said roller 175 is adapted to contact and roll upon the under surface 176 of rigid plate 159.

In the FIG. 16 form the rubber pad between the end of the liquid spring and the underside of the diving board has been eliminated and a smooth rolling action has been substituted.

The liquid spring 55 is relatively non-adjustable except perhaps as to the volume of liquid which may be used initially. In other words, as shown in FIG. 4 the characteristic of the spring is dependent to a large extent upon the volume of liquid in the chamber 91 and this volume may be changed, but at the expense of raising or lowering the initial position of the diving board. Where this initial position cannot be changed said spring 4 is, to all intents and purposes, non-adjustable.

Several adjustable types of springs which may be substituted for spring 55, are shown in FIG. 20 and in the succeeding figures. In FIG. 20 the adjustability of the spring is obtained by providing two separate chambers, with means for using only one chamber or both chambers. When but one chamber is used, the spring is substantially identical with the spring in FIG. 4, but when both chambers are used, the change in characteristics brought about by the additional volume of liquid provided by the second chamber makes the spring as a whole softer.

Referring now to FIGS. 20 to 23 for a detailed description of the modification shown therein, the spring proper is shown at 177 and contains all of the elements of spring 55, including operative end 84, ball 85, threaded sleeve 98, plunger 102, chamber 91 and housing 83. The side opening 103, however, does not lead to a fill opening, but instead leads to the interior of a second cylindrical housing 178 which, for convenience, may be made from the same tubular stock of which housing 83 is made and which is welded to the side of housing 83 concentrically with opening 103 therein. Said housing 178 is closed at its outer end by a sleeve 179 which is welded thereto, said sleeve having a bore 180 threaded at its outer end 181 and partially closed by an inwardly directed flange 182 at its inner end.

A valve 183 in the form of an axially reciprocable rod is adapted to extend to opening 103 and seal said opening with respect to the exterior of housing 83. Said valve 183 passes through opening 180 in sleeve 179 and is sealed with respect thereto by a ring 184 of packing which is retained at one end in sleeve 179 by a washer 185 bearing against flange 182 and at its other end by a threaded sleeve 186 threadedly received in the threads 181 of sleeve 179. Said threaded sleeve 186 functions as a gland nut to tighten the packing ring 184 against the valve 183 and the interior of ball 180.

A cap 187 is secured by screws 188 over the ends of housing 178, sleeve 179 and sleeve 186, and has a threaded opening 189 therein to receive the reduced and threaded end of a knob 190, the latter in turn being received over the end 191 of the valve 183 and secured against relative axial movement with respect thereto by a snap ring 192.

To provide access to the threaded sleeve 186 from the exterior of cap 187, said cap is formed with oppositely disposed slots 193 (FIG. 23) through which an appropriate tool such as a spanner wrench may be inserted to engage appropriate openings in the outwardly projecting end of sleeve 186.

The fill opening for the spring in the form shown in FIG. 20 is identical to that shown in FIG. 4 and is shown at 195 in FIG. 21. The fact that housing 178 is identical with the housing 83 makes it possible to use the identical fill opening assembly including the thick-walled tube 104 and each of the elements disposed therein. An opening 196 (FIG. 20) is provided in housing 178 to provide access to the chamber 197 formed therein by the interior of housing 178 and the end of sleeve 179 and the packing retained therein.

Spring 177 must be installed in such manner as to provide ample space for housing 178 and accordingly cannot be inserted into a cylindrical cup such as 79 of FIG. 1. The cup 79 must therefore be modified to provide an appropriate opening (not shown) through which said housing 178 may protrude. When in use, spring 177 provides two ranges of characteristics. In the first, valve 183 is closed so that only chamber 91 is effective. In this condition spring 177 functions precisely like spring 55. For the second range of characteristics valve 183 is open, thereby in effect adding chamber 197 to chamber 91 and providing a softer action for the spring. Thus, when the diving board is to be used solely or predominantly by children, valve 183 is opened by turning the knob 190 in a manner to withdraw said rod from opening 103 and thereby add chamber 197 to chamber 91. When the diving board in which the valve is installed is to be used solely or predominantly by adults, said valve 183 is closed by turning knob 190 in the opposite sense to advance said valve into opening 103 until said opening is closed. This provides a stiffer action for the spring.

In the modification shown in FIG. 24, a construction similar to that shown in FIG. 20 is used, except that two chambers such as 197, are formed, each with its separate control so that three ranges of characteristics are provided. Thus, there is a central chamber provided by housing 83, one side chamber provided by housing 178 and a third chamber provided by a housing 198, it being understood that all of the elements associated with and disposed within the housing 178 of FIG. 20 are contained in housing 198. Only one fill opening is required, however, and therefore said fill opening housing 104 is attached to housing 83 in precisely the same manner as illustrated in FIG. 4. Thus the fill opening is disposed between the housings 178 and 198 and may be used to fill the chamber within housing 83 and the chambers within the housings 178 and 198, provided the valves therein are open to permit the liquid to flow thereinto. The knob for controlling the valve in housing 178 is shown at 190 and the knob for controlling the valve in housing 198 is shown at 199. It may be apparent that a further modification of the method of mounting the liquid spring in the diving board support is required to accommodate the spring shown in FIG. 24.

In the modification shown in FIGS. 25 and 26, two ranges of characteristics are again provided with the use of two chambers, the second chamber, however, differing from those previously described in that it is in the form of an annular housing 200 which surrounds the lower regions of housing 83 and is welded thereto. Said annular housing 200 forms with the exterior surface of housing 83 an annular chamber 201, the volume of which is greater than that of chamber 197 of FIG. 20, and therefore provides a greater difference, that is, a greater softness in the second range of operation of the liquid spring. A valve 202, identical in all respects with valve 183 of FIG. 20, except as to its being slightly shorter, is used to open and close the side hole 103 in housing 83. Annular housing 200 is provided with a radially extending boss 203 within which is contained a supporting and sealing structure for the valve 202 and which is identical to that shown in FIG. 20. The fill opening is again contained in a housing 104 which is identical to the fill opening and associated check valve shown in FIG. 4, said thick wall tube 104 being secured over an opening 204 communicating with chamber 201 and disposed substantially 180° away from knob 190. It is understood, of course, that said thick wall tube 104 may be located at any angular position with respect to said knob 190, but for purposes of illustration, has been shown to be directly opposite thereto.

The modification shown in FIGS. 27, 28 and 29, is similar to that shown in FIGS. 25 and 26, except that a plurality of chambers is provided around the main housing with means for successively adding chambers to the main chamber, thereby successively increasing the volume of liquid acted upon by the plunger. To simplify the showing, the upper part of the liquid spring containing the operative end of the plunger and its packing is not shown, it being understood that the upper end is identical to the upper end of FIG. 4. The lower end, however, is modified by lengthening housing 83 of FIG. 4 and replacing the disc 92 which closes off the chamber 91 with the mechanism shown in FIG. 27.

Thus, in FIG. 27, the housing 205 has four chambers, 206, 207, 208 and 209 (FIG. 28) preferably cast directly therein in radially extending bosses with passageways 210, 211, 212 and 213, respectively, connecting the chambers 206, 207, 208 and 209 to the central chamber 214. The bottom of chamber 214 is closed by a cup packing 215, having the usual annular lip 216 which is deformed by fluid pressure to expand radially into sealing engagement with the walls of the chamber 214. Said cup packing 215 is secured by a stud 217 to a plug 218, which is slidably received in the threaded bottom end 219 of the extension of the walls of the chamber 214. Said plug abuts upon an adjusting screw 220 received in the threads of end 219 of chamber 214. A lip seal 221 is retained in an annular recess 222 in plug 218 and passages 223 are provided in the walls of the recess to communicate with the bottom of the cup packing 215, so that any fluid under pressure which may be present at that location may be utilized to activate the lip seal.

In the FIG. 27 form the characteristics of the liquid spring may be changed or softened by successively adding the chambers 209, 208, 207 and 206 to chamber 214. This is accomplished merely by turning screw 220 in a direction to uncover one or more of the passages 213, 212, 211 and 210. Thus the spring may be operated merely from the fluid in chamber 214 by advancing cup packing 215 into the chamber until all of the auxiliary chambers 206, 207, 208 and 209, are blocked off. If the characteristics of the liquid spring, using chamber 214 alone, are too stiff, then the cup 215 may be lowered to expose passage 213 leading to chamber 209. This adds the volume of chamber 209 to that of chamber 214. If the characteristics are still too stiff, then cup packing 215 is lowered still further to expose the next passage 212 and add the associated chamber 208 to chambers 209 and 214. Further softening of the characteristics is achieved by successively opening passages 211 and 210 and adding their associated chambers 207 and 206, respectively, to the chambers already connected to chamber 214.

It is understood that in the FIG. 27 form a fill opening (not shown) will be used above the highest chamber, that is, above chamber 209, said fill opening being substantially identical to that shown in FIG. 4. It may be necessary to add liquid to chamber 214 as the cup packing 215 is lowered, if the spring plunger is not to be lowered, although each of the chambers 206 to 209, when once filled, will remain filled whether or not they are in use.

In the several modifications of the liquid spring described above, changes in characteristics of the spring were achieved by changing the volume of the liquid in the spring. Changes in characteristics, however, may also be achieved by using a constant volume of liquid, but in effect, changing the volume of the piston or plunger which is actuated by the deck. One such variable plunger design is shown in FIGS. 30 to 35.

Referring now to FIG. 30, the housing 224 for the spring there shown may be made of the same thickwalled tubing as the spring shown in FIG. 4, and like that spring, the bottom of the spring is closed off by a plate 225 which is welded to the interior of said housing 224 with a fluid-tight weld. The bore 226 representing the interior wall of the housing 224 is counterbored at 227 to form a shoulder 228 against which a washer 229 may bear. Adjacent washer 229 is a ring of packing 230 which is compressed against washer 228 by a threaded sleeve 231 received in the threaded upper end 232 of counterbore 227. The upper end of sleeve 231 is provided with radially inwardly extending recesses 233 which may be reached from the exterior of the housing 224 through slots 234 formed substantially 180° apart in the housing 224 adjacent to or in substantial axial alignment with recesses 233. Thus the threaded sleeve 231 may be turned in the threaded upper end 232 of the counterbore to compress packing ring 230 against washer 229 by inserting a tool through the slots 234a into the recesses 233 and turning the sleeve within the limits permitted by the size of a slot 234a.

A cylindrical plunger 234 extends into housing 224 and is provided with a ball 236 by which it may be attached to a pad such as 86 in FIG. 1, under the deck of a diving board. Said ball 236 thus performs substantially the same function as ball 85 in the form shown in FIG. 1. Surrounding plunger 234 over the mid-lower regions thereof is a sleeve 237 which, as will be brought out hereinafter, functions a secondary plunger in the spring of FIG. 30. The lower end 238 of sleeve 237 extends into the chamber 239 formed by bore 226, plate 225 and washer 229. Said sleeve 237 is received within and sealed with respect to bore 226 by packing ring 230 and is centered in the bore by a bearing sleeve 240 disposed around sleeve 237 within the threaded sleeve 231. Said bearing sleeve 240 has a flange 241 extending into an appropriate recess in sleeve 231 by which said bearing sleeve 240 is prevented from moving outwardly relative to sleeve 231 by pressure exerted thereupon by the liquid in chamber 239 through the packing ring 230.

The side hole 103, thick-walled tube 104, and fitting 106 and the associated check valve and inner passageway for filling chamber 239 are precisely the same as the like-numbered parts shown in FIG. 4.

It may be apparent from the description thus far given that if sleeve 237 is stationary and plunger 234 is reciprocated within sleeve 237, the liquid in chamber 239 will be effected solely by plunger 234 and will have whatever characteristic is provided by the volumetric relationships established between the plunger and chamber. If, however, sleeve 237 is at some stages of the movement of plunger 234 caused to move with said plunger 234 then the volume of liquid tended to be displaced, that is, compressed by the combined plunger 234 and sleeve 237 is increased by the effective volume of the sleeve 237 introduced into chamber 239, and consequently a stiffer action will be produced during the time that said sleeve 237 is moving in chamber 239 with plunger 234. The means by which a simultaneous movement of sleeve 237 with plunger 234 is effected will now be described.

At the upper end 242 of sleeve 237 is formed a threaded head which is threaded into a cylindrical fitting 243. The latter in turn is slidably received in a bearing sleeve 244 interposed between sleeve 243 and a counterbore 245 in the upper end of housing 224. A flange 246 on sleeve 244 is received in a corresponding recess in the upper end of housing 224 and is retained in said recess against axial movement therein by a cap 247, said cap 247 in turn being secured by screws 248 to the upper end of housing 224. The upper end of cap 247 is turned inwardly to form a flange 249 which overlies a portion of the upper end of fitting 243 to retain said fitting against axial movement upwardly out of housing 224. A bearing sleeve 250 in the upper end of fitting 243 serves to guide the upper end of plunger 234 in housing 224. The lower portion of fitting 243 has a recess 251 to receive a ring 252 of packing which is retained in said recess by a washer 253 and the head 242 of sleeve 237. Said head 242 is threadedly received in the recess 251 and is provided with radially disposed recesses 254 into which may be inserted a spanner wrench or the like to turn said sleeve and head in the fitting 243. Said fitting is in turn provided with recesses 255 in the upper end thereof by which said sleeve may be held against rotation while the sleeve 237 is rotated. Slots 256 (FIG. 34) are cut in the sides of housing 224 in substantial radial alignment with the recesses 254 to provide access to the housing to said recesses 254.

The upper end of plunger 234 near the ball 236 has a radially extending flange 257 formed thereon which is adapted to overlie bearing sleeve 250 as well as the upper end of fitting 24. When plunger 234 is depressed into housing 224, flange 257 is moved downwardly toward fitting 243. During the downward movement the liquid in chamber 239 is compressed by plunger 234 and the pressure is increased in the liquid and acts in all directions so that it acts upon the end 238 of sleeve 237 to push said sleeve upwardly and, through the washer 253 and packing 252, exerts a pressure upon fitting 243 to hold said fitting against flange 249 on cap 247. After flange 257 on plunger 234 strikes fitting 243, continued downward movement of the plunger causes fitting 243 and sleeve 237 to move downwardly so that the lower end 238 of sleeve 237 becomes an additional plunger moving with plunger 234. The volume of liquid tending to be displaced by the combined plungers is increased and the stiffness of the spring is likewise increased.

The form of liquid spring shown in FIG. 30 thus provides a two-stage action, the first stage of which is relatively soft so that the diving board can be readily deflected by a child, and the second stage of which provides a stiffer action to accommodate principally adults. Since the second stage is not effective until the diver has passed through the first stage, both stages are effective for the adult diver.

In FIGS. 36, 37 and 38, is shown a modification of the diving board of FIG. 1 which is especially adapted for use with a diaphragm liquid spring, such as is shown in FIGS. 39 to 48 inclusive, to be hereinafter described in detail. In this modification there is provided a diving board 258 made up of steel sheets and weldments, including a deck 259, side plates 260, 261, and thicker reinforcing cross members 262 and 263. Further stiffening members 264, 265 and 266 disposed between stiffening members 262 and 263 define a substantially square area with members 263 in which is welded a plate 267 against which the liquid spring of the diving board bears.

Diving board 258 is supported by two substantially vertical side plates 268 and 269 secured by welding or otherwise, to a transverse angle iron 270. Said plates 268 and 269 extend forwardly from angle iron 270, and the forward ends thereof are secured together by a horizontal plate 271, the rear regions of which 272 are bent upwardly, as shown in FIG. 36, to provide a tilted base on which a liquid spring 273 of the diaphragm type is mounted. Said spring terminates in a ball 274 which is received in an appropriate socket in a pad 275 which, in turn, is covered with a rubber pad 276 for noiseless contact with plate 267. The construction of the connection between the ball 274 and the rubber pad 276 is substantially the same as that for the spring in FIG. 1.

The diving board 258 is supported from the side plates 268 and 269 by a pivot pin 278 passing through said side plates and through the stiffening members 264 and 265, which, as may be apparent, function also as the means by which the diving board is supported from the side plates. Appropriate reinforcing inserts 279, 280, 281 and 282 are welded to each of the members through which the pivot pin 278 passes to provide a greater bearing area for the pin. Appropriate snap rings 283 and 284 on the pivot pin serve to prevent the pin 278 from moving axially relative to said plates 268 and 269, and antifriction spacing washers, such as 285, serve to maintain ample clearance between the members 264 and 265 on the one hand and the side plates 268 and 269 on the other. Appropriate means (not shown) may be used to secure the angle iron 270 and the forward end of the plate 271 to the preferred foundation 53 adjacent a pool.

The details of construction of the spring 273 are shown in FIGS. 39 to 42.

Liquid spring 273, as shown in FIG. 39, is comprised of a tubular housing 286 closed off at its lower end by a disc 287 appropriately welded to the housing to form a fluid-tight fit, and the whole is mounted on a mounting plate 288 which, in the form chosen to illustrate the spring, is of rectangular form to fit into the space between the side plates 268 and 269 and upon the inclined portion 272 of the plate 271. Outside threads 289 are formed near the upper end of housing 286 which engage internal threads of a cap 290, the upper end of which extends radially inwardly in the form of a flange 291. The upper end of housing 286 is closed by a diaphragm 292 of flexible reinforced material, such as reinforced rubber. A ring 293 is retained within cap 290 and fits over the outer regions of the diaphragm 292 and slightly overlaps the inner edges or surface of housing 286. Over ring 293 is placed a tubular extension 294 having a flange 295 extending radially outwardly under flange 291 of cap 290. Ring 293 has a recess 296 by which tube 294 is centered with respect to ring 293. Appropriately secured to the upper inner regions of tube 294 is a bearing sleeve 297 within which is slidably retained a plunger 298. The upper end of plunger 298 is provided with the ball 274 previously mentioned as the connecting means between the springs and the pad 275. A ring 299 is welded to the plunger 298 and forms a limit stop for said plunger on its inward movement relative to tube 294.

It is contemplated that in the form shown in FIG. 39 the liquid spring will have four distinct stages, and that with the use of a diaphragm, sealing between stages will be eliminated. Thus the plunger 298 is provided with a reduced diameter end or pin 300 reciprocable within nested sleeves 301, 302, and 303. The outer sleeve 303 has a radially outwardly extending flange 304 which normally bears against the upper wall 305 of a recess 306 formed between the abutting ends of tubular housing 286 and tube 294. Recess 306 is longer in an axial direction than the axial dimension of flange 304, so that said sleeve 303 may be reciprocated in said recess 306.

Nested sleeve 302 has a flange 308 which normally abuts upon a shoulder 307 formed in the inner surface of nested sleeve 303. Nested sleeve 301 has a large diameter section 309 over which the inner surface 310 of sleeve 303 slides and a small diameter section 311 having a surface 312 over which sleeve 302 is adapted to slide. Said sleeve 302 has a shoulder 313 formed in the upper region thereof, and sleeve 301 has an inturned flange 314 at the upper end thereof which is adapted to abut upon shoulder 313.

Plunger 298 has a shoulder 316 thereon adapted to contact only the upper end 317 of sleeve 301. Plunger 298 has a diameter which is greater than the greatest diameter of section 309 of sleeve 301, so that the bottom surface 318 of plunger 298 is adapted to contact the upper end 319 of sleeve 303. The lower ends of pin 300 and of each of the sleeves 301, 302 and 303, when in their uppermost positions, are arranged in axially staggered relation, as shown in FIG. 39, so that a conical central section 320 of the diaphragm 292 contacts and is supported by said lower ends when the said diaphragm is in a relaxed position. Said diaphragm 292, the interior of the housing 286 and the disc 287, for a chamber 321 for the liquid of the liquid spring. Said chamber has an opening 103 by which said chamber may be filled with the liquid for the spring, said opening leading to the interior of a thick-walled tube 104 in which is received a threaded fitting 106 having a passageway 107 normally closed by a check-valve 108. Tube 104 and the contents thereof are substantially identical to the like-numbered tube and contents in FIG. 4.

Diaphragm 292 is preferably made of heavily reinforced rubber impregnated material which may be molded to the shape shown in FIG. 39. Said diaphragm may have molded therein opposed square beads 322, 323 of circular form fitting in corresponding grooves in the upper end of housing 286 and the lower end of ring 293, said beads serving to center and mechanically lock said diaphragm in the housing and ring. A dowel pin 324 may be passed through diaphragm 292 and into appropriate recesses in housing 286 and ring 293 to hold the diaphragm and ring against rotation relative to the housing 286 when cap 290 is screwed into place on housing 286.

It is contemplated that diaphragm 292, and particularly the conical sections 320 thereof, will be forced into chamber 321 in four successive stages, thereby providing a four-stage liquid spring. The various stages, including the initial pressurization of the liquid in the chamber 221 are shown in FIGS. 43 to 48, inclusive. In the first stage, pin 300 contacts the apex of the conical section 320 and begins to push it into chamber 321, thereby creating a pressure in the liquid therein. This pressure causes the diaphragm to distort into contact with the end surfaces of each of the sleeves 301, 302 and 303, as well as the bottom end of pin 300, as shown in FIG. 43. This downward movement of pin 300 continues until shoulder 316 contacts the end 317 of the sleeve 301. It may be noted that pin 300 and sleeve 301 are substantially the same length, although this is not absolutely essential to the proper functioning of the spring. This is shown in FIG. 44.

With shoulder 316 in contact with end 317 of sleeve 301, continued downward movement of the plunger 298 moves both sleeve 301 and pin 300 together so that the effective area now working upon the diaphragm is the combined area of the ends of pin 300 and sleeve 301. During the initial downward movement of pin 300 into sleeve 301, said sleeve 301, as well as the other nested sleeves 302 and 303, are held against vertical movement under the pressure developed in the liquid in chamber 321 by their interlocking relationship at their lower ends and ultimately by the abutting relationship between flange 304 and the upper wall 305 of recess 306.

The downward movement of sleeve 301 with pin 300 creates higher pressures in chamber 321, which are again resisted by sleeves 302 and 303 through the interlocking relationship between them and between sleeves 303 and the tube 294.

In the next stage shown in FIG. 45, sleeve 301 contacts the upper end 325 of sleeve 302 and begins to move sleeve 302 downwardly against the conical diaphragm center 320 along with sleeve 301 and the pin 300. Thus the area of sleeve 302 is added to the areas of the sleeve 301 and pin 300, so that the stiffness of the spring as a whole is increased over that of the sleeve 301 and pin 300 together. This movement will continue until, as shown in FIG. 46, the bottom 318 of plunger 298 contacts the upper end 319 of sleeve 303. At this stage, in the form chosen to illustrate this invention, the bottom surfaces of sleeves 301 and 302 and the bottom surface of pin 300 are co-planar with the bottom surface of sleeve 303. Further downward movement of the plunger 298 thus causes sleeve 303 to move with the preceding sleeves 302 and 301, as well as with the pin 300, so that the total area now effective upon the liquid in chamber 321 is the sum of the areas of the ends of the three sleeves, 301, 302 and 303, and the area of the pin 300. Such joint downward movement may continue through the stage shown in FIG. 47 where the diaphragm 292 is substantially planar, to the stage shown in FIG. 48 where the central portion 320 now projects into chamber 321 below ring 293. Destruction of the diaphragm by excessive movement of the plunger 298 is prevented by the bottoming of flange 304 upon shoulder 326 on ring 293.

Although spring 273 is shown to have a separate mounting plate 288 and thus to be self-supporting, it is understood that said plate may be dispensed with and that spring 273 may be used with a cup such as 79 of FIG. 1. It may also be noted that spring 273 is provided with a ring 299 which serves as a limit stop and that a stop function is also performed by flange 304 abutting upon shoulder 326 of ring 293. It is contemplated, however, that ring 299 will be normally relied upon to provide the stopping function and that shoulder 326 will be in the nature of a safety device which will be effective to prevent shearing of the diaphragm 292 in the event that ring 299 should break and plunger 298 should continue to move into chamber 321. Thus spring 273 provides a multi-stage action without complex assembly problems due to a multiplicity of glands and seals, and is in general a simple, leak-proof spring.

Thus the foregoing illustrated embodiments of my invention comprise simple and safe means for providing resilience for a metal diving board and further, they provide varying and adjustable degrees of resilience so that the same board may be used for children as well as for adults. Simple means, either manually controlled or progressively and automatically operable are provided for changing the spring "rate" of the hydraulic springs provided by this invention and for maintaining them in operative condition. The angle of the thrust of said springs relative to the horizontal is such as to insure a forward component to the spring-back of the board while entailing the minimum side thrust upon the plunger of the spring.

It is understood that the foregoing description is illustrative of preferred embodiments of this invention and that the scope thereof is not to be limited thereto, but is to be determined by the appended claims.

I claim:

1. A diving board comprising a platform, a deck, pivot means on the platform and deck for supporting the deck for oscillating movement of the deck relative to the platform in a vertical plane, and means resiliently restraining the deck against downward oscillating movement, said means comprising a cylinder, means on the platform for supporting the cylinder, a plunger disposed adjacent to the deck for movement therewith, said plunger having one end thereof in said cylinder, means for effecting a seal between the plunger and cylinder, and a liquid filling the cylinder and contacting the end of the plunger in said cylinder, said plunger displacing liquid as it is moved into the cylinder and thereby compressing said liquid to create a resilient spring-back for the plunger and the deck.

2. A diving board as described in claim 1, said means on the platform for supporting the cylinder being inclined forwardly of the diving board to reduce the side thrust of said plunger to a minimum.

3. A diving board as described in claim 1, and means for shifting the cylinder supporting means toward and away from the pivot means to change the apparent stiffness of the means resiliently restraining the deck against downward oscillating movement.

4. A diving board as described in claim 1, said platform comprising spaced upright side plates, spaced cross plates connecting the side plates, said means on the platform for supporting the cylinder comprising a cup, and means for supporting said cup from said cross plates with the axis of the cup inclined forwardly relative to said diving board.

5. A diving board as described in claim 4, said means for supporting said cup comprising a track on the cross plates and directed at right angles to the axis of the pivot means, a saddle supported on the track for sliding movement thereon, and cooperating screw means on the saddle and on one of said cross plates for changing the position of said saddle relative to said cross plates and thereby changing the distance between the cup and pivot means.

6. A diving board as described in claim 4, and an elastomeric lining interposed between the cup and the cylinder.

7. A diving board as described in claim 1, said platform comprising a cup for supporting the cylinder, three legs rigidly secured to the cup and extending outwardly therefrom into contact with a floor, said pivot means on the platform and deck comprising a standard extending outwardly and upwardly from the cup under the deck, reinforcing members adjacent the standard, said reinforcing members and standard having aligned openings therein, and a pivot pin extending through said aligned openings.

8. A diving board as described in claim 7, and having further a link pivoted at one end to the standard, means connecting the plunger to the link, and means at the other end of the link contacting the deck.

9. A diving board as described in claim 8, said means at the other end of the link contacting the deck comprising a slide, means adjustably securing the slide to the link, a track on the deck, and a roller on the slide rolling on said track.

10. A diving board as described in claim 8, said means defining a chamber comprising a wall spaced from and connected to the wall of the cylinder, said means interposed in the passageway for closing the passageway to fluid in the cylinder comprising a second plunger in the cylinder and movable into the cylinder and across said passageway, and adjustable means for moving said second plunger into said cylinder and across said passageway.

11. A diving board as described in claim 1, and including further means defining a chamber adjacent the cylinder and a passageway connecting the chamber with the interior of the cylinder, and means interposed in the passageway for closing the passageway to fluid in the cylinder.

12. A diving board as described in claim 10, and means for adjusting the degree of closing of said passageway to fluid in said cylinder.

13. A diving board as described in claim 11, said means for changing the effective volume of the plunger comprising a diaphragm extending across the end of the plunger in the cylinder and sealing the plunger from the liquid, a sleeve surrounding the plunger and contacting the diaphragm, a lost motion connection between the sleeve and cylinder and a lost motion connection between the sleeve and cylinder and a lost motion connection between the sleeve and plunger, said sleeve being held by the said lost motion connection with the cylinder against movement out of the cylinder and said sleeve being movable against the diaphragm into the cylinder by the plunger after the lost motion connection between the sleeve and plunger has been taken up.

14. A diving board as described in claim 1, and means for changing the initial volume of liquid acted upon by the plunger.

15. A diving board as described in claim 1, and means for changing the effective volume of the plunger as the plunger enters the cylinder.

16. A diving board as described in claim 15, said means for changing the effective volume of the plunger comprising a diaphragm extending across the end of the plunger in the cylinder and sealing the plunger from the liquid, and a plurality of concentric sleeves surrounding the plunger and contacting the diaphragm, means on the sleeves and cylinder limiting outward movement of the sleeves relative to said cylinder, and means moveable with the plunger and adapted to contact said sleeves successively with the plunger against said diaphragm.

17. A diving board comprising a deck, a cylinder, legs secured to the cylinder and supporting said cylinder with its axis inclined forwardly of the diving board, a standard supported by the cylinder and extending rearwardly and upwardly of the cylinder and secured thereto, pivot means on the standard supporting the deck for oscillating movement in a vertical plane, and liquid spring means in the cylinder and contacting the deck for resiliently restraining the deck in its downward oscillating movement and for imparting a spring-back to said deck.

References Cited

UNITED STATES PATENTS

| | | | |
|---|---|---|---|
| 1,698,751 | 1/1929 | Dobbins | 272—66 |
| 2,212,460 | 8/1940 | Stephenson | 272—65 |
| 2,251,766 | 8/1941 | Stank | 272—66 |
| 2,691,518 | 10/1954 | Smith | 267—1 |
| 2,764,413 | 9/1956 | Wisner | 272—66 |
| 2,852,258 | 9/1958 | Dunklee | 272—66 |
| 2,873,963 | 2/1959 | Taylor | 267—64 |
| 2,909,368 | 10/1959 | Taylor | 267—64 |
| 2,985,443 | 5/1961 | Smith | 267—1 |
| 2,988,373 | 6/1961 | Jewell | 267—64 |
| 3,017,172 | 1/1962 | Hartel | 267—64 |

FOREIGN PATENTS 372,882   5/1932   Great Britain.

RICHARD C. PINKHAM, *Primary Examiner.*

RICHARD W. DIAZ, Jr., *Assistant Examiner.*

U.S. Cl. X.R.

267—64

PO-1050
(5/69)

UNITED STATES PATENT OFFICE
CERTIFICATE OF CORRECTION

Patent No. 3,450,404      Dated June 17, 1969

Inventor(s) WM. J. NIGHTINGALE

It is certified that error appears in the above-identified patent and that said Letters Patent are hereby corrected as shown below:

Pat. Col. 1, line 14 after "platform" change ";" to --.--;
(Appl. amendment - abstract added, line 20).

Pat. Col. 4, line 2, after "63" insert --64--;
(Appl. page 6a, line 29).

Pat. Col. 4, line 15 "are" should read --is--;
(Appl. page 7, line 10).

Pat. Col. 10, line 59 after "functions" insert --as--;
(Appl. page 21, line 31).

Pat. Col. 11, line 6, after "some" - "stages" should be --stage-
(Appl. page 22, line 20).

Pat. Col. 12, line 34 "said" should be --side--;
(Appl. page 25, line 20).

Pat. Col. 12, line 40 shows "preferred" should read --prepared--
(Appl. page 25, line 25).

Pat. Col. 12, line 68 "springs" should be --spring--;
(Appl. page 26, line 18).

IN THE CLAIMS:
Pat. claim 16, line 33 after "successively" insert --to move said sleeves successively--; (Appl. line 14).

SIGNED AND
SEALED

SEP 30 1969

(SEAL)
Attest:

Edward M. Fletcher, Jr.
Attesting Officer

WILLIAM E. SCHUYLER, JR.
Commissioner of Patents